United States Patent Office 3,743,557
Patented July 3, 1973

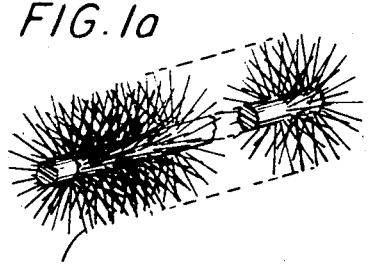
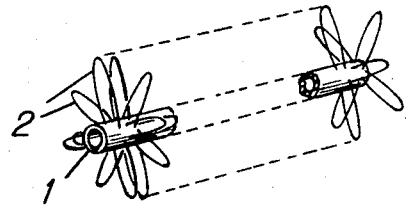
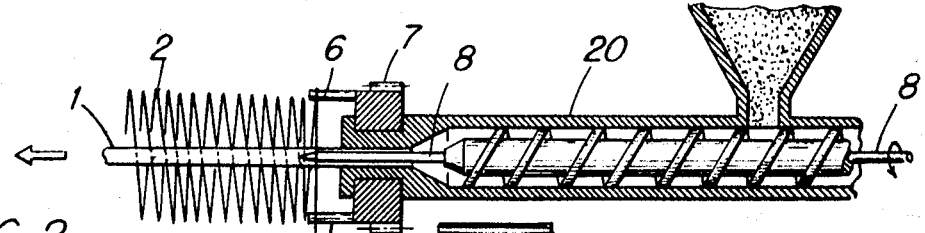
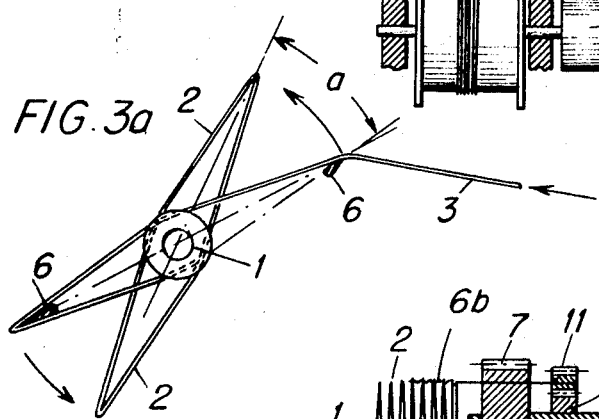
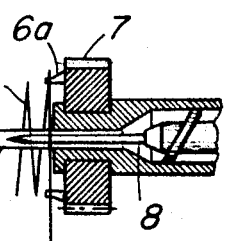
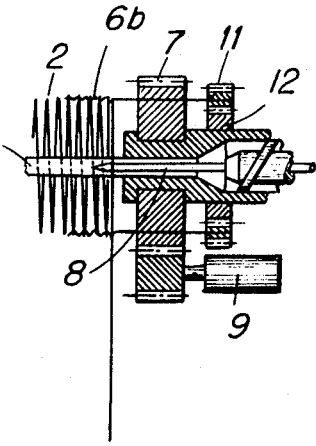
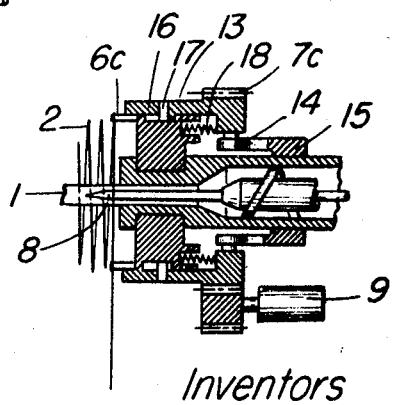
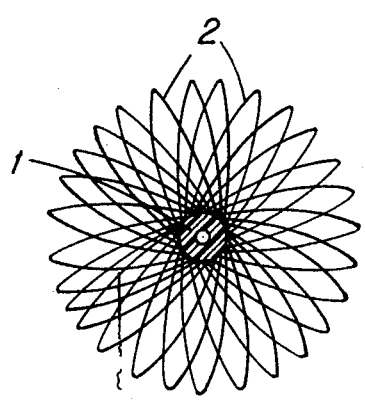
Inventors
Klaus Grohmann
Christian Stöhr
Siegbert O. Wagner
By Davis, Hoxie, Faithfull & Hapgood
Attorneys

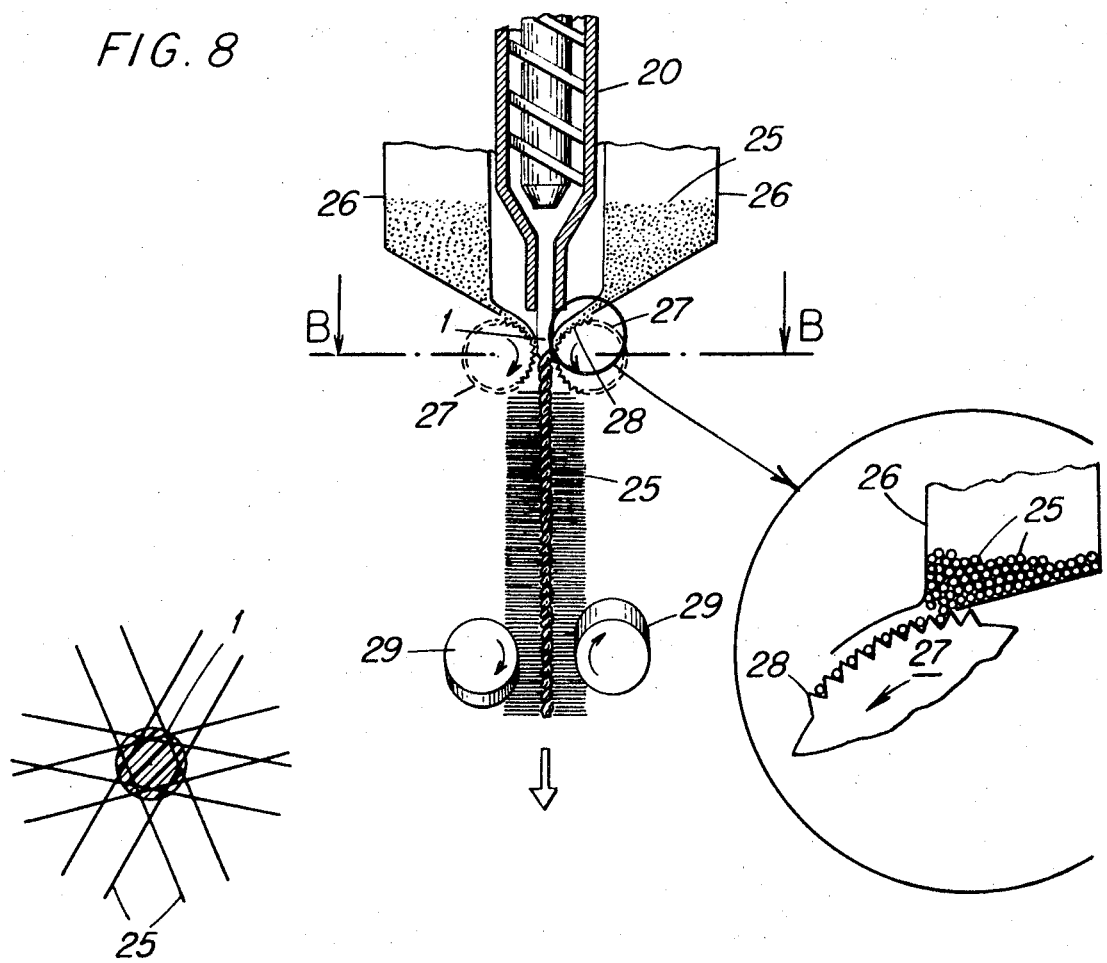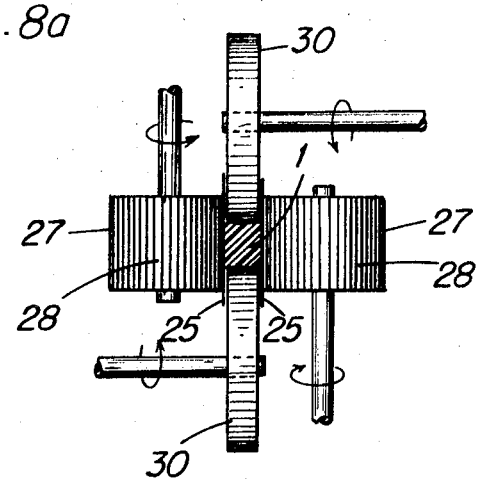

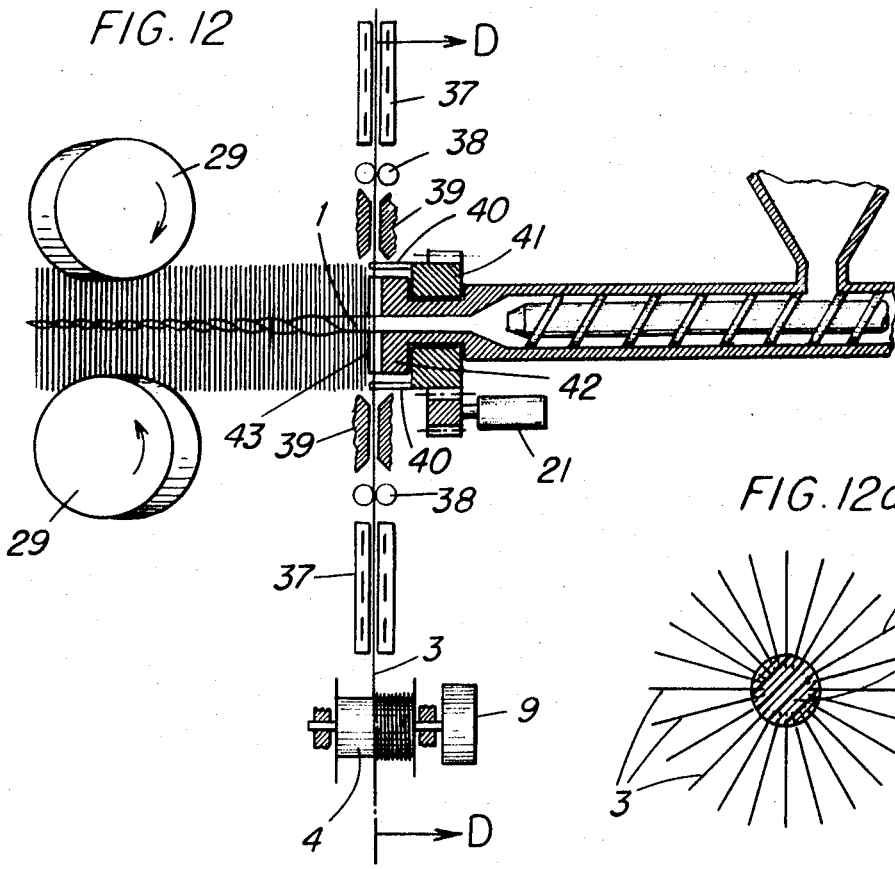
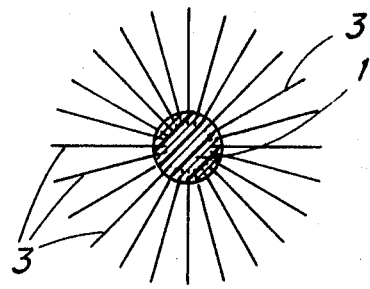
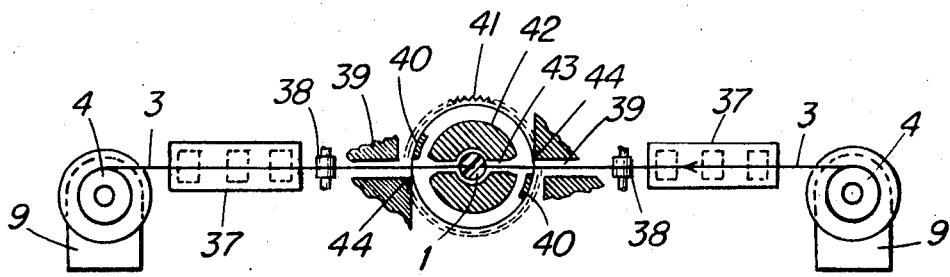
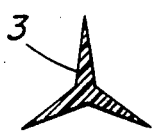

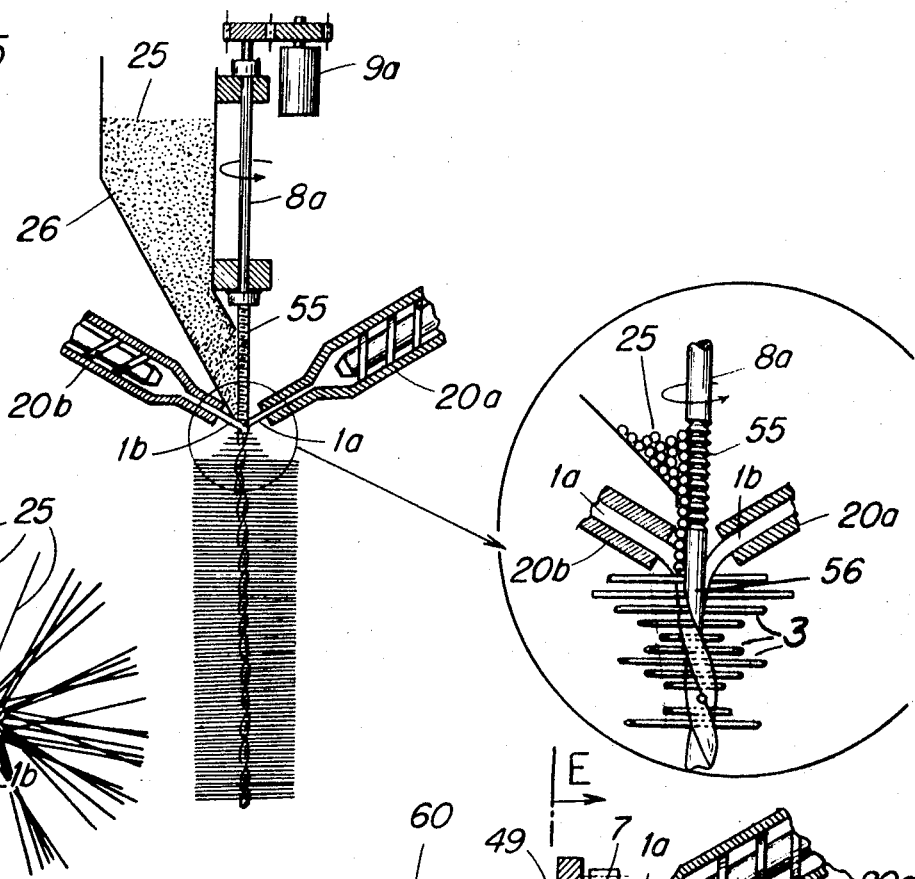
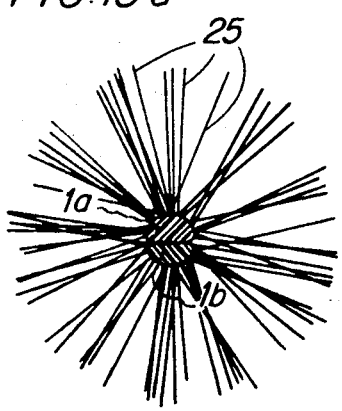
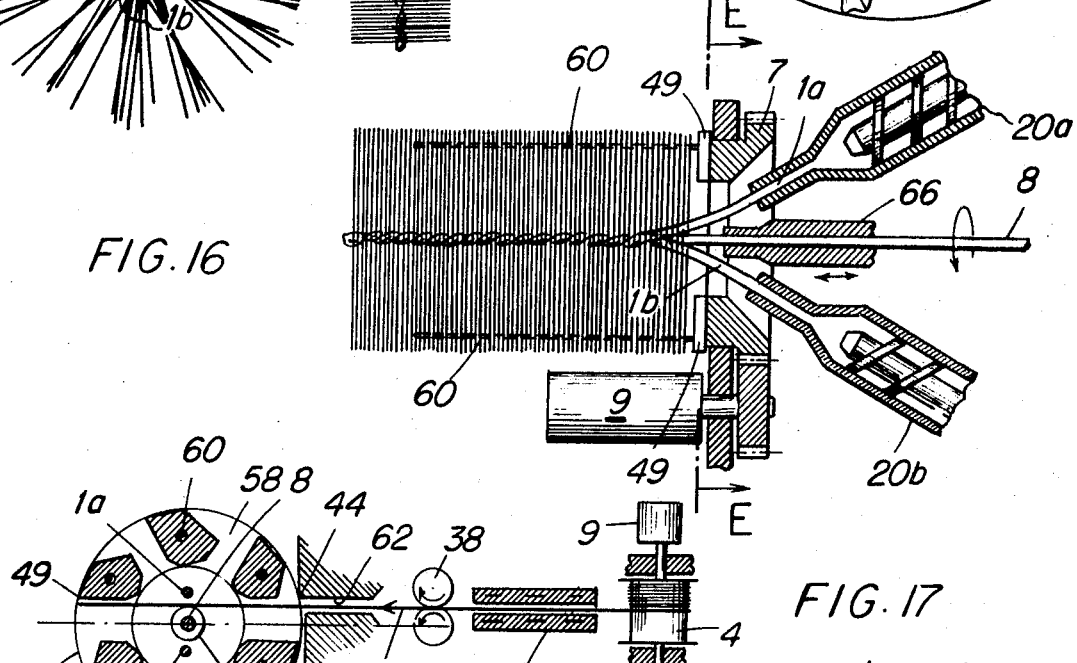

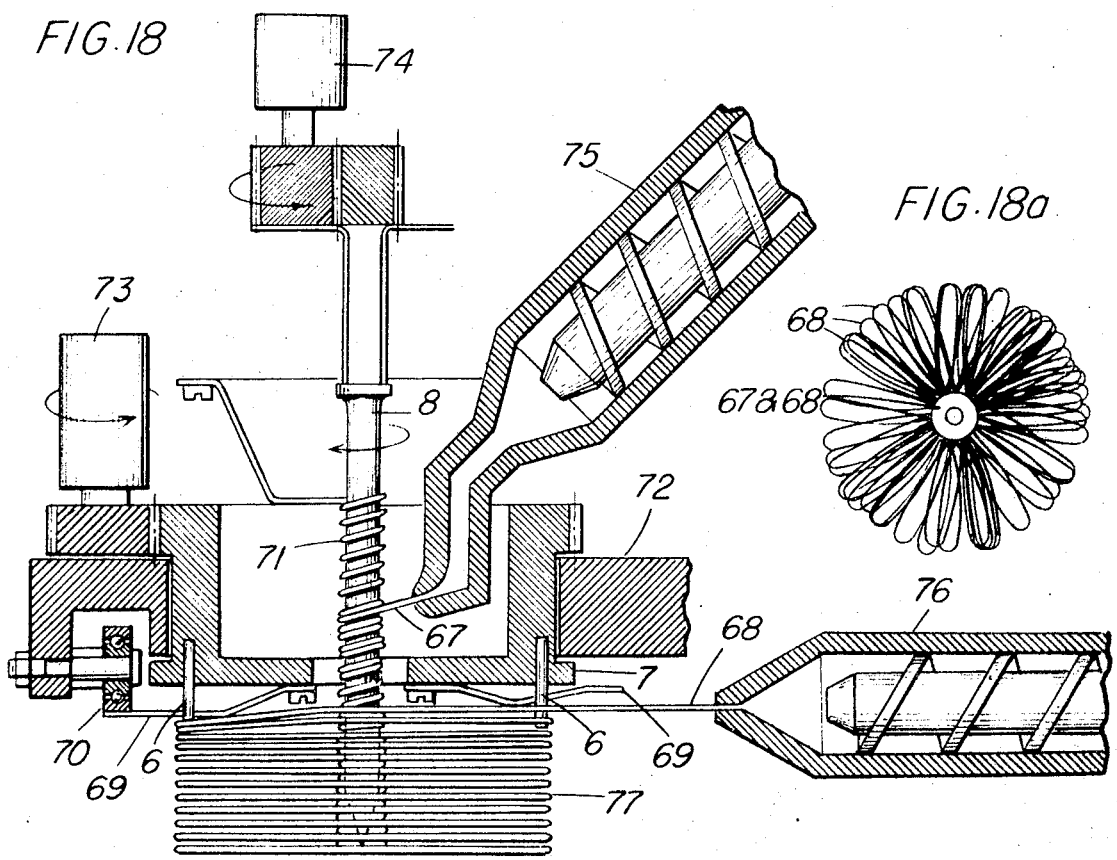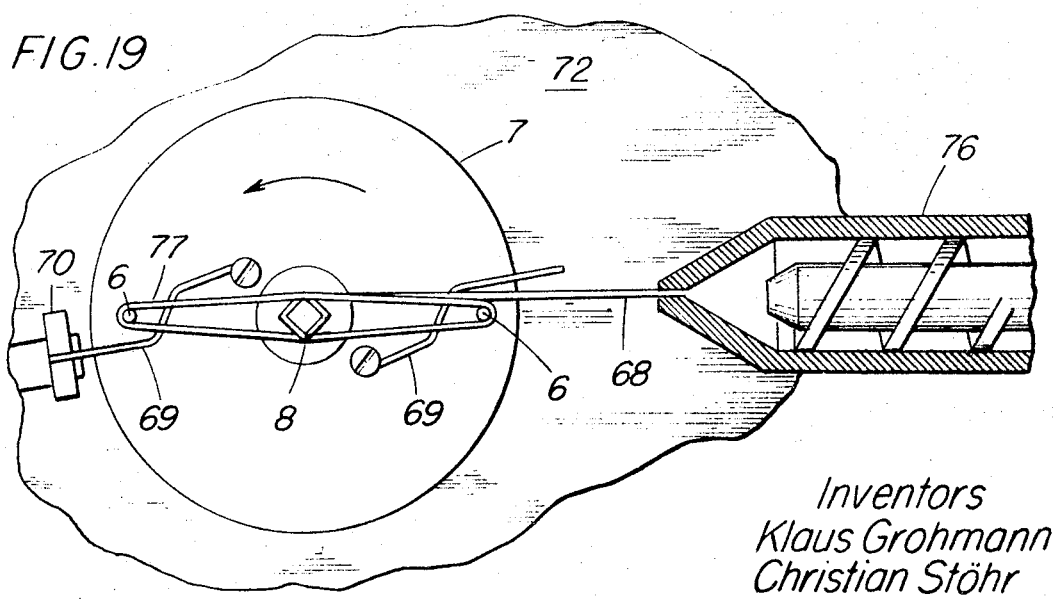

3,743,557
BRUSH AND METHOD OF MANUFACTURE
Christian Stöhr, Zeyern, and Klaus Grohmann, Dusseldorf, Germany, and Siegbert O. Wagner, Omaha, Nebr., assignors to Rayette-Faberge, Inc., New York, N.Y.
Filed Feb. 6, 1969, Ser. No. 797,013
Int. Cl. A46b *3/04*
U.S. Cl. 156—72                                      27 Claims

ABSTRACT OF THE DISCLOSURE

Brushes having a plastic core and radiating bristles are made by several techniques including impressing bristle filament loops, lengths or other configurations into the plastic core while in a plastic state. This may be accomplished by winding a filament about the core, pressing a filament into the surface of the core, penetrating the core with the end of the filament, entrapping filament between entwined plastic core strands twisted into a rod, or winding filaments about a mandrel to form both the core and bristle loops from the filament.

---

The present invention is concerned with the manufacture of brushes of the sort having bristles radiating from a central core. The brushes of the present invention can be entirely made of plastic materials. Brushes made in accordance with the present invention exclusively of plastic material eliminate chemical attack, corrosion, and chemical reaction problems present in brushes using wire cores. Our brushes can be made in continuous indefinite lengths and cut to a desired length without diminishing the security of the bristles near the cut. The bristles and core are unified into an integral unit by autogenous welding and have a very high strength bristle attachment. No adhesives are used. Because of the continuous nature of our methods, the production rate of our brushes is remarkably high and the cost is very low. Our brushes are significantly lighter in weight than brushes with metal wire cores. Because of the freedom from corrosion, lightweight and low cost, our brushes are particularly well suited for use in hair rollers used in the setting of hair. Our brushes can be made in a variety of shapes, patterns and configurations to particularly suit their ultimate use.

Fundamentally, the brushes of the present invention are made by combining bristle monofilaments with a plastic core such that the filaments radiate from the core as bristles. This result can be accomplished by various techniques which are related.

Bristle loops formed from a continuously supplied filament are applied around a plastic core, either singly or multifilarly. As a result of tension on the filament, the loops are impressed into the core and surrounded by the core material at the area of contact so that they become solidly embedded.

Bristle lengths, bristle loops, bristle coils, or other bristle filament configurations are continuously impressed into a plastic core by means of profiled pressure rollers or the like or the ends of the filaments are penetrated into the core by feed means to solidly embed the bristle configurations.

Bristle lengths or other precut bristle configurations are continuously placed between two or more generally parallel plastic strands. By entwining or twisting the plastic strands, the bristles are captured and uniformly radially distributed about the core of twisted strands.

Plural filaments are multifilarly wound about a supporting mandrel with one or more of the filaments periodically retained on a holding means to form loops which radiate from the axis about which the filaments are wound.

In each of these several variants, where the materials of the filaments and the core are thermoplastic, the retained heat of extrusion will cause an autogenous weld to result in an extraordinary strength of bristle attachment. In those variants which result in loops or coils deployed along a core, the distal portion of the filament loops may be severed to form a pair of bristles from each loop.

These several techniques and variants of these techniques as well as the brushes produced thereby will be described in detail.

In the drawings:

FIGS. 1a and 1b are perspective views of typical brushes according to the present invention;

FIG. 2 is a schematic illustration of apparatus for performing a first technique of making a brush similar to those of FIG. 1;

FIG. 3a is an enlarged end view of the brush as it is being formed by the apparatus of FIG. 2;

FIG. 3b is an enlarged end view of a typical brush produced by the first technique;

FIGS. 4–6 show variants of the apparatus of FIG. 2;

FIG. 7 shows a knife attachment for the apparatus of FIG. 2;

FIG. 8 is a schematic illustration of apparatus for performing a second technique of making a brush similar to those of FIG. 1;

FIG. 8a is an enlarged end view of a typical brush produced by the second technique;

FIG. 9 is a sectional view taken in the plane B—B of FIG. 8 and enlarged for clarity;

FIG. 12 is a schematic illustration of apparatus for performing a third technique of making a brush similar to those of FIG. 1;

FIG. 12a is an enlarged end view of a typical brush produced by the third technique;

FIG. 13 is a sectional view taken in the plane D—D of FIG. 12 and slightly reduced in size;

FIG. 14 is a cross-sectional view of a bristle filament suitable for use in the apparatus of FIG. 12;

FIG. 15 is a schematic illustration of apparatus for performing a fourth technique of making a brush similar to those of FIG. 1;

FIG. 15a is an enlarged end view of a brush produced by the fourth technique;

FIG. 16 is a schematic illustration of apparatus for performing a variation of the fourth technique of making a brush similar to those of FIG. 1;

FIG. 17 is a partial sectional view taken in the plane E—E of FIG. 16;

FIG. 18 is a schematic illustration of apparatus for performing a fifth technique of making a brush similar to FIG. 1b;

FIG. 18a is an end view of a brush produced by the fifth technique; and

FIG. 19 is an end view of the apparatus of FIG. 18.

THE FIRST TECHNIQUE

Figure 10:
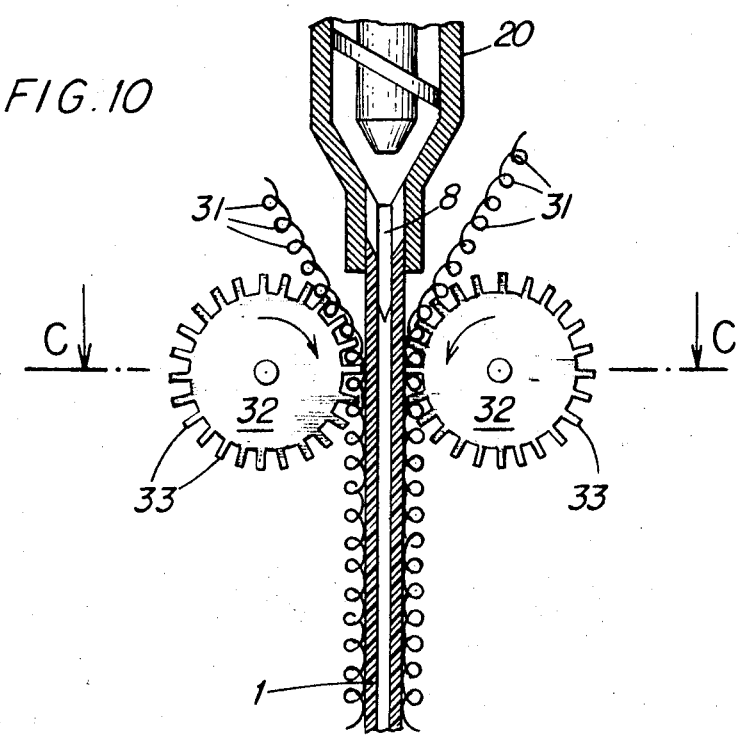
FIG. 10 is a schematic illustration of apparatus for performing a variation of the second technique of making a brush similar to those of FIG. 1.

The apparatus of FIG. 2 produces a brush by extruding a central core about which a monofilament of plastic or metal is wound in a loop form. Tension on the filament strands of the loop causes the strands to penetrate the still warm extruded core rod while it is in a plastic state to solidly impress and embed the proximal portions of the strands in the core. By "plastic state" is meant that condition of a material in which it can be permanently deformed without harm. When the filament is a thermoplastic material of similar characteristics to that of the core, heat fusion or welding of the filament strands to the core may also occur to result in an integrated structure. The distal ends of the loops may be severed to form individual bristles from the strands of the loops.

In FIG. 2 a conventional plastic extruder 20 extrudes a thermoplastic tubular core 1 about an internal supporting mandrel which extends beyond the extrusion orifice to support the unhardened hot plastic. Arranged about the axis of the plastic core is a rotating loop forming member 7 having a peripheral gear driven by a pinion 22 on the shaft of a motor 21. Member 7 is provided with a pair of diametrically opposed loop holding pins 6. A supply of filament 3 is carried by a supply spool 4 having an adjustable brake 9 to provide a desired restraining tension as the filament is pulled from the spool. As loop forming member 7 revolves, one of pins 6 intercepts the tensioned filament 3 between the supply spool and the portion embedded in the core on the previous revolution. Because of the retention of the end of the filament on the core, that pin 6 which now intercepts the filaments carries the filament with it as the pins revolve. A loop 2 is completed when that pin has moved to a position diametrically opposite to its position when it first intercepted the filament. The tension on the filament present between that pin 6 and the supply as a result of brake 9 causes the portion of the filament which is now in contact with the core to impress and embed itself therein. Thus, both sides of the loop are embedded in the core. The distal end of the loop is carried by that pin which formed the loop. As revolution of the loop forming member 7 continues, the other pin now intercepts the filament to form another loop. The filament is formed into loops deployed as a flattened helix about the core rod 1. The radial length of the loops is determined by the remoteness of pins 6 from the axis of extrusion of the core. The restraining tension on the filament is established by brake 9 to cause the filament to be impressed or embedded into the recently extruded mandrel supported portion of core 1 while it is still in a soft plastic state from its extrusion.

The result is seen in FIG. 3a as being radially extending loops 2 diametrically opposite sides of the core rod 1. The filament 3 is shown in FIG. 3a as it is pulled from a supply by one of pins 6. The portion of the filament which contacts the soft core impresses and embeds itself therein. To insure adequate embedment of the strands of filament in the core, it is necessary that the pin 6 be of a width less than that of the core rod 1.

The faormed loop is removed from the pin 6 about which it was formed by virtue of the fact that the core rod 1 advances from the extruder in the direction of brush propagation. Since the proximal ends of the loops are securely embedded in the core and the core is advancing, the loops advance with it. Pins 6 are smooth to permit the pin contacting distal portion of the loop to slide along the pin 6 until the loop slides off the end of the pin. The ability of the formed loop to slide is added by the heating of the filament by the retained heat of extrusion. This heating of the filament allows for slight elongation of the filament of the loop to relieve the residual tension in the filament. The core with embedded loops can be cooled with air or other media to harden the thermoplastic of the core. If the filament is a thermoplastic similar to that of the core, those portions of the filament which are embedded into the core will be partially melted by the retained heat of the core to cause desirable autogenous welding of the filament to the core.

Internal supporting mandrel 8 supports the still soft extrusion in this region of winding and embedment. Mandrel 8 can be fixed or made capable of rotation. When mandrel is rotated in synchronization with gear 7, a flat brush is obtained wherein bristle loops are arranged behind one another with no relative radial offset. By rotation of the mandrel with respect to gear 7, as by fixing mandrel 8 stationary or by rotating it out of synchronization with gear 7, successive loops 2 are radially offset from one another by an angle $a$ as is shown in FIG. 3a. Angle $a$ is related to the relative speed differential between gear 7 and mandrel 8 such that larger speed differentials result in large displacements of adjacent loops with the result of a uniform radial distribution of britle loops. This uniform radial distribution is shown in FIG. 3b. As the radial angle $a$ is reduced by reducing the relative speed differential, a brush having a spiral appearance is produced. Such spiral appearance can also be achieved by twisting the rod about its axis.

FIGS. 4–6 show variants of means to cast off the loops 2 from pin elements 6. FIG. 4 shows the use of pins 6a obliquely arranged with respect to the axis of the core and resulting brush. The previously formed bristle loops can more easily remove themselves from the sloping configuration of pins 6a of FIG. 4 than from the straight pins 6 of FIG. 2.

FIG. 5 shows pins 6b which possess spiral threads having a pitch spacing approximately equal to the space between adjacent loops. Threaded pins 6b are driven by small pinions 11 which mesh with a stationary gear 12. The rotational speed and direction of pins 6b is such that the loops are advanced along the threads of pins 6b in the direction of propagation of the brush and at a speed equal to that of the core 1.

FIG. 6 shows a stripper sleeve 13 which reciprocates to push the loops off pins 6c. Stripper sleeve 13 is caused to reciprocate by means of cam follower rollers 14 which ride on a stationary contour cam 15. Stripper sleeves 13 have a gear 7c on its outer surface which corresponds to gear 7 of FIG. 2. Stripper sleeve 13 is associated with the loop forming pin carrier 16 by means of short dowel pins 17 which are slidably received in longitudinal slots in pin carrier 16. Thus, stripper sleeve 13 can reciprocate with respect to pin carrier 16 but cannot rotate with respect to it. The driving of gear 7c by motor 9 causes stripper sleeve 13 and pin carrier 16 to rotate for loop forming. As cam follower rollers 14 ride on the contoured end surface of cam 15, stripper sleeve 13 is moved axially of pins 6c to push loops 2 from the pins. Springs 18 bias the rollers 14 against the cam surface 15 and return the stripper sleeve 13 to again expose pins 6c.

The brush produced by the above described apparatus and method has closed loops 2. This form of brush is useful for many purposes. The loops may be cut to form the individual bristles typical of the brushes of the prior art. FIG. 7 shows how the loop holding pins 6 of apparatus similar to that of FIG. 2 may be fitted with knives 24 which cut the distal tips of loops 2 as they are removed axially of the pins 6.

More than two loop holding pins 6 can be used to deploy the filament in a polygonal fashion such as a triangle. The core 1 must be of a diameter sufficient that a line between pins describes a chord of the core so as to cause the filament to intercept and embed in the core. Unusual brush configurations can be made in this fashion.

THE SECOND TECHNIQUE

The bristle embedment techniques illustrated in FIGS. 8–11 depend upon impressing the bristles into the still soft care 1 by pressure means rather than the tension on a continuous filtment as is used in the technique of FIG. 2. The form of brush produced by the second technique is shown in FIG. 8a.

In the technique illustrated in FIGS. 8 and 9, a pair of hoppers 26 supply parallel cut monofilament lengths 25 by gravity such that the lengths 25 are arranged on opposite sides of, and tangent to, the freshly extruded thermoplastic core rod 1 while it is still in a plastic state. Individual bristle lengths 25, are extracted from the hopper and depoyled in notches 28 on the periphery of a pair of rollers 27. The notches 28 are in the form of gear teeth dimensioned to hold but one bristle length. They select a single bristle length 25 from a hopper and convey it to the core rod 1.

The rollers 27 rotate with a peripheral speed approximating the linear speed of the extrusion of the core rod 1. Rollers 27 are spaced from each other with a clearance which is less than the extruded width of the core so that the bristle lengths conveyed by the rollers are impressed into the still plastic state core 1. Flow of the soft thermoplastic material of the core about the embedded bristle lenghs is promoted by a pair of pressure rollers 30 positioned at right angles to rollers 27. Rollers 30 are configured to plastically deform the core in the region where the bristle lengths are impressed into the core by rollers 27. This arrangement of rollers is shown in FIG. 9.

The cut bristle lengths are thus deployed along opposite sides of the core rather like a pair of double combs. The resultant straight comb of bristles is useful in this form but more frequently is converted to a brush having uniformly radially displaced bristles by twisting the still soft thermoplastic core after the bristles have been embedded. A pair of skewed axis rollers 29, which themselves may be brush rollers, are rotated in a known manner to cause twisting of the bristled core 1. Materials other than plastic can be used for the bristle lengths. When thermoplastic bristle filaments are used they may be united with the core rod by autogenous welding.

Figure 11:
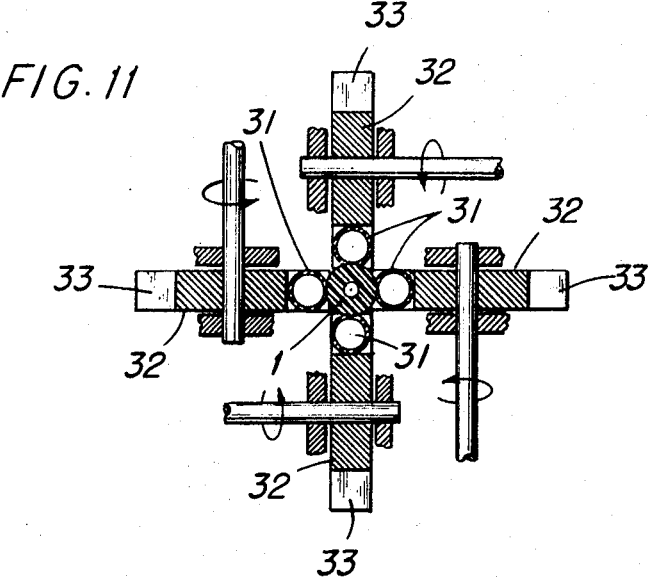
FIG. 11 is a sectional view taken in the plane C—C of FIG. 10 and enlarged for clarity.

In the variation of the second technique shown in FIGS. 10 and 11 an extruder 20 produces an advancing core rod 1 into which prefabricated continuous helical coils 31 of monofilament are impressed while the freshly extruded thermoplastic core 1 is in a plastic state. A plurality of rollers 32 have radial blades 33 arranged to be placed between each turn of the helical filament coil 31. The radial blades 33 convey the preformed filament coil to the soft surface of the core and there impress the portion of the helical coil turn proximate the end of the blade 33 into the core 1. FIG. 11 shows an arrangement of four orthogonal rollers 32, however, it is apparent that the number of coils and their shape can be varied to suit the needs of the product. The thermoplastic core can be extruded in any shape which presents lineal surfaces for embedment of the coils. For example, the core can be in the cross-sectional form of a star with radiating arms equal in number to the coils and rolls and the coils embedded on the ends of the arms. The embedded coils may be subsequently cut to produce individual bristles and may be of materials other than plastic.

THE THIRD TECHNIQUE

FIGS. 12 and 13 illustrate a technique for manufacturing brushes wherein the bristle filament is thrust into a thermoplastic core while in a plastic state. The continuous filament can be cut to form a bristle normal to the axis of the core. The form of brush produced by this technique is shown in FIG. 12a. The core 1 can be extruded and the bristles inserted while it is still in a plastic state. Bristle filament 3 is supplied from supply spools 4 having adjustable tension brakes 9. On the way toward the core 1, the curl characteristic of spooled filament can be removed by passing it through a heater muffle 37. Drive rollers 38 frictionally engage and advance the filament 3 and thrust the free end into the soft core.

A gear member 41 is coaxial with and rotated about the core 1 by means of a motor 21. Gear member 41 rotates about a stationary member 42 which is also coaxial with the core 1. Stationary member 42 is provided with a transverse channel 43 radial to the core 1 for guiding and confining the advancing bristle filament 3 to aid in penetrating the core 1 with the free end. Similar filament guide channels 39 are aligned with channel 43 so as to provide guidance for that portion of the filament which is pushed toward the core by drive rollers 38. A symmetrical arrangement permits simultaneous insertion of a pair of bristles. Rotating gear member 41 carries revolving knives 40 which cooperate with fixed knife edges 44 to provide a shear to cut the inserted filaments to bristle length. The revolving knives 40 are angularly positioned such that the filaments are advanced and inserted into the soft core to the correct depth just as the revolving knives shear the distal end of the bristle free from the filament supply. With this technique, filament feed is continuous rather than intermittent thereby obviating need for stop and start mechanisms and the disadvantages of acceleration and stopping of the filament. The speed of insertion of bristles can be very high for economical production rates. Although less preferred, the bristle lengths can be severed prior to insertion.

The brush resulting from this process can be twisted about the axis of the core to uniformly radially distribute the bristles by employing skewed axis rollers 29 which rotate in a known manner to twist the core 1. Such twisting rollers may be in the form of brushes.

FIG. 14 shows a cross-section of one form of a filament having considerable stiffness for its unit weight which is particularly useful in the technique of FIGS. 12 and 13.

The soft thermoplastic core can be hardened by cooling with air or water. Bristle filaments may be of various materials but thermoplastic materials are preferred because they can be fused or autogenously welded to the core to create a brush of extraordinary strength.

THE FOURTH TECHNIQUE

In FIG. 15, at least two plastic core strands 1a and 1b are extruded from two or more extruders 20a and 20b or from a single extruder having plural extrusion orifices. The plural extruders or orifices are arranged on opposite sides of the axis of brush propagation and at an angle thereto such that the strands intersect on that axis. Centrally above the junction point of the two core strands and in the axis of brush propagation a rotating spindle 8a having threads 55 and driven by a motor 9a is provided with a conical point 56 which reaches into the already combined plastic strands. Laterally above the junction point of the two plastic strands a hopper 26 feeds pre-cut bristles 25 to the thread 55 of spindle 8a. By capturing the bristles within the thread grooves 55 the spindle 8a selects and feeds individual bristles continuously into the junction point of the two plastic core strands 1a and 1b. In addition, the conical point 56 of the rotating spindle 8a causes the two plastic strands to twist or entwine whereby the inserted bristles 25 are captured and intertwined with the strands. The twisted strands fuse to form a unitary core rod. Through the even twisting operation of the plastic strands 1a and 1b, the retained bristles 18 are distributed in a radially uniform fashion and a continuous brush profile is obtained. The form of brush produced by the fourth technique is shown in FIG. 15a. Autogenous welding of the bristles within the strands may be accomplished when thermoplastic bristle filament is employed. Through subsequent cooling by air or water the plastic strands harden, and the bristles remain solidly joined to the strands.

In the variation of this technique shown in FIGS. 16 and 17 at least two plastic core strands 1a and 1b produced by plural extruders 20a and 20b or a single extruder with plural extrusion orifices are joined at an angle at the end of a mandrel 8 rotating in the axis of brush propagation. Surrounding this junction point of the two core strands there is concentrically arranged an intermittently driven gear 7 which is provided on its face with regularly spaced guide slots 58 which are formed with knife edges 49 on their peripheries. Needles 60 are provided between the guide slots 58. A stationary knife edge 44 cooperates with knife edges 49 to form a shear. Ahead of the knife edge 44 is a guide channel 62, a drive roller pair 38, a muffler heater 37, as well as a spool 4 with a brake 9.

By means of the feed roller pair 38, the bristle filament 3 is pulled from the spool 4 under tension controlled by brake 9 through the heater muffle 37 wherein it is straightened. The drive roller pair 38 advances the bristle filament through a guide slot 62 and further between the plastic core strand 1a and 1b and onto the periphery of the knives 49. When the filament 3 has been advanced to this position, the gear 7 is rotated whereby the knife 49 on the gear 7 moves straight against the stationary knife 44 and cuts the filament to bristle length. At the same time, a reciprocating sleeve 66 which surrounds mandrel 8 pushes the bristle out of the slot 58 and into the junction point of the two plastic strands. By means of the rotating mandrel 8, the plastic strands and the bristles are intertwined. The steps of feeding, cutting, and insertion are controlled such that they repeat themselves continuously, whereby an endless brush is obtained. The brush profile obtained is carried by the needles 60 until the plastic has hardened. Autogenous welding of the bristles within extruded strands is obtained. The brush profile obtained is carried by the needles 60 until the plastic has hardened. Autogenous welding of the bristles within the entwined strands may be accomplished when thermoplastic bristle filament is employed.

THE FIFTH TECHNIQUE

FIGS. 18 and 19 are directed to a technique in which a brush is fashioned exclusively of thermoplastic filamentary material which preferably is extruded as filaments as a part of the brush manufacture. In essence, the filament is looped about a mandrel to form bristle loops and to simultaneously form a hollow supporting core. This technique produces a brush of unlimited length at an extraordinary speed directly from plastic raw materials. Operation of the apparatus is entirely automatic and continuous. The form of brush produced by this technique is shown in FIG. 18a.

A gear member 7 is rotated about a central axis by a motor 73. The gear member is positioned with an aperture in a stationary frame member 72. Winding pins 6 are carried by the gear member 7 and protrude from the face thereof. Coaxial with and extending through the gear 7 is a mandrel 8 which rotates in the same direction as gear 7 and is driven by a motor 74. Mandrel 8 is preferably polygonal in shape.

A first filament extruder 75 is positioned to extrude a first plastic state thermoplastic filament 67 toward mandrel 8 about which the filament 67 wraps in a spiral as the mandrel 8 rotates. A stationary guide means 71, which may take the form of a helical coil of wire, surrounds the mandrel and serves to space the turns of extruded filament 67 into a helix of uniform pitch about the rotating mandrel. The stationary guide means 71 causes the helical filament to advance with respect to the mandrel toward its terminal end in the direction of propagation of the brush.

One or more filament extruders 76 are positioned to extrude additional plastic state thermoplastic filament 68 toward the mandrel 8. Filaments 67 and 68 can be produced by a single extruder having plural extrusion orifices. The additional filament 68 is wound multifilarly with filament 67 and occupies the space between the spaced turns of the helix formed from the first filament 67.

Loop holding pins 6 carried by a rotating loop forming member having a peripheral gear 7, intercept the second filament 68 and pull the filament into loops 77 having their proximal ends wrapped about the mandrel 8 and their distal ends about one of the loop holding pins 6. Because both first filament 67 and second filament 68 are in a plastic state, they fuse into an integral tube about the mandrel, the tube having filament loops 77 radiating from its axis.

The loops 77 are cast from the ends of the pins by spring wire members 69 which are affixed at their inboard ends to rotating gear 7. As the gear revolves, the outboard extending end of spring members 69 intercept the outer race of a ball bearing 70 which is affixed to the stationary member 72. The outboard end of spring member 69 is forced to move axially of the pin 6 nearer the ball bearing 70 to thereby push loops 77 off that pin 6.

Uniform radial distribution of the bristle loops is accomplished by the fact of mandrel 8 rotating at a speed different from that of pin carrying gear 7.

Alternatively, a brush similar to that produced by the technique of FIGS. 18 and 19 can be formed from spooled preformed thermoplastic filaments which are heated to cause fusion of the filaments. The technique of direct extrusion is preferred.

A brush differing somewhat in having higher bristle density and a less strong core can be formed with a single filament 68 which is fused to itself on the following revolution. Another form of brush similar to the preferred form can be made from a single filament by the use of pins 6 which reciprocate such that one loop is cast about a pin 6 for each two revolutions of the gear 7 and mandrel 8 and the other revolution simply wraps a complete turn about the mandrel.

In all the described embodiments, preference has been shown for thermoplastic filaments and core materials. The low cost, easy extrudability, and autogenous weldability of thermoplastics make them most suited to all embodiments. Exemplary of such thermoplastics are polyethylene, polypropylene, nylon, Delrin, vinyls, urethanes, acetates, acrylics and various copolymers and mixtures thereof. As has been indicated, the filaments can be of other materials including other plastics, metal, glass, and natural fibers.

It is apparent that the bristle filaments can be formed into various configurations having particular uses. The core can be formed in various cross-sectional shapes, can be formed about a reinforcing insert or can be made hollow. With a hollow core, it is apparent that a fluid product can be contained within the cavity and dispensed to the bristles.

Throughout the specification and the claims the word multifilar has been used as a convenient way to indicate the concurrent use of two or more filaments in precisely the same sense as the word bifilar denotes two filaments.

We claim:

1. The method of making a brush having an axial core provided with transverse bristles comprising the steps of
   extruding a core rod in a plastic state,
   supplying continuous filament for the formation of bristles,
   forming loops of the filament about the core rod and a loop holding means which is remote from the core rod a distance approximating the desired length of the loops,
   distributing said loops generally radially about the core rod with the distal portion of the loop supported by the loop holding means,
   impressing the proximal portion of the loop into the core rod, and
   hardening the core rod to retain therein the impressed portion of the loops.

2. The method of making a brush having an axial core provided with transverse bristles comprising the steps of
   extruding a tubular thermoplastic core rod about a central supporting mandrel,
   maintaining the mandrel supported portion of the core rod in a softened state,
   supplying continuous filament from the formation of bristles,
   forming loops of the filament about the core rod in the region of the supporting mandrel and a loop holding means which is remote from the core rod a distance approximating the desired loop length,
   distributing said loops generally radially about the core rod with the distal portion of the loop supported by the loop holding means,
   impressing the proximal portion of the loop into the said region of the core rod and hardening the core rod to retain therein the impressed portion of the loops.

rod to retain therein the impressed portion of the loops.

3. The method of claim 2 wherein the proximal portions of the loops are impressed into the core rod by exerting tension on the filament as the loop is formed about the core rod and loop holding means.

4. The method of claim 3 wherein the loop is formed by revolving the loop holding means about the core rod axis at a radius determinative of loop length, whereby the revolving loop holding means intercepts and pulls filament from the supply.

5. The method of claim 2 including the step of severing the distal portion of the loops to form bristles radial to the core.

6. The method of claim 4 wherein the supporting mandrel and the loop holding means are relatively rotated to distribute adjacent loops radially about the core rod.

7. A method of making a brush having an axial core provided transverse bristles comprising the steps of
providing a core rod of plastic material in a softened state,
helically winding a continuous filament about the core rod in the form of loops with the proximal ends of the loops impressed into the core, and
hardening the core rod.

8. The method of claim 7 including the step of severing the loops near their distal ends.

9. The method of claim 8 wherein the lengths are impressed into the surface of the core rod intermediate their ends so as to form two bristles from each length.

10. The method of claim 9 wherein lengths are impressed into the surface of the core rod at diametrically opposite positions to lie in parallel planes along the core rod.

11. A method of making a brush having an axial core provided with radial bristles comprising the steps of
maintaining a core rod of a plastic material in a softened state,
forming a continuous filament into a helical coil,
aligning the axis of the coil proximate and parallel to the core rod,
impressing the proximal portions of the turns of the coil into the surface of the core rod, and
hardening the core rod.

12. The method of claim 11 wherein plural coils are impressed into the core rod at radially displaced positions.

13. The method of claim 11 wherein the coil turns are cut to form bristle lengths.

14. The method of making a brush having an axial core with generally transverse bristles comprising the steps of
extruding a thermoplastic core rod,
arranging cut lengths of filaments tangent to the core rod in a region where the core rod is still in a plastic state,
impressing the cut lengths into the core at their tangent portions,
twisting the core rod about its axis to deploy the impressed filament lengths in a uniform radial distribution about the core rod, and
hardening the core rod.

15. The method of claim 14 including subsequent to the impressing step the further step of compressively deforming the core rod to cause flow of the material of the core rod about the impressed filaments to embed the filaments.

16. The method of making a brush having an axial core provided with transverse bristles comprising the steps of
extruding a thermoplastic core rod,
providing a supply of filament in the form of a helical coil,
aligning the axis of the helical coil parallel to the axis of the core with portions of the turns of the coil tangent to the surface of the core rod,
impressing the tangent portion of the turns into the core rod, and
hardening the core rod to retain therein the impressed turns.

17. The method of claim 16 including the further step of severing the turns of the impressed coil at a position remote from the tangent portions to thereby form individual bristles.

18. A method making a brush having an axial core provided with radial bristles comprising the steps of
maintaining a core rod of a plastic material in a softened state,
impressing filamentary material into the surface of the core to retain the filamentary material in an orientation generally transverse to the axis of the core rod, and
twisting the core rod about its axis after the filamentary material is retained in the core rod and while the core rod is in the softened state.

19. The method of claim 18 wherein the filamentary material is a filament positioned radially of the core rod, and the filament is impressed by advancing it along its axis until the end penetrates the core rod.

20. The method of claim 19 wherein the filament is supplied as a continuous length from which bristle lengths are severed after penetration of the core.

21. The method of claim 19 wherein plural filaments are penetrated into the core from plural radially displaced positions.

22. The method of making a brush having an axial core provided with transverse bristles comprising the steps of
extruding two heat softened thermoplastic strands,
twisting the still soft extruded strands about each other to form a fused core rod, and
embedding lenghs of filament in the softened strands as the strands are twisted about each other.

23. The method of claim 22 wherein the filament is cut into lengths after it is supplied to the intersection of the extruded strands.

24. The method of making a brush entirely from thermoplastic materials comprising the steps of
providing a first filament,
winding the first filament about a rotating mandrel in a helix with spaced turns,
advancing the helix axially of the mandrel in a direction of brush production,
providing a second filament,
winding radially extending loops of the second filament about the mandrel and a pin which revolves about the mandrel axis at a distance equal to the loop radial length, said second filament being positioned on the mandrel intermediate the turns of the first filament,
and fusing the first and second filaments together.

25. The method of claim 24 wherein the filaments are extruded and wound about the mandrel while at a temperature above their fusion point.

26. A method of making a brush having an axial core provided with transverse bristle loops including the steps of extruding in an axial direction at a predetermined rate a soft plastic core of predetermined size, looping about the core a continuous filament in elongated filament of the loops while tensioning the loops to force filament portions intermediate the loop ends inwardly toward the core until the said portions are separated by a distance less than said predetermined core diameter thereby to embed the said portions in the soft core, and advancing the loops thus formed in said axial direction at said predetermined rate as a structure integral with said core.

27. A method of making a brush having an axial core provided with radial bristles comprising the steps of
maintaining an all plastic core rod in a softened state,
impressing filaments of predetermined length into the core rod generally transverse to the core rod axis,
radially deploying the filaments about the core rod axis by twisting the core rod with the filaments impressed therein, and
hardening the core rod.

References Cited
UNITED STATES PATENTS

| | | | |
|---|---|---|---|
| 3,331,727 | 7/1967 | Lieval et al. | 161—22 |
| 3,233,270 | 2/1966 | Melcher | 300—21 X |
| 3,384,689 | 5/1968 | Logan | 161—22 X |
| 2,267,850 | 12/1941 | Ushakoff | 300—21 |
| 3,314,095 | 4/1967 | Prange | 300—21 X |
| 3,352,604 | 11/1967 | Melcher | 300—21 X |

FOREIGN PATENTS

| | | | |
|---|---|---|---|
| 1,179,303 | 5/1959 | France | 300—21 |

CARL D. QUARFORTH, Primary Examiner

E. E. LEHMANN, Assistant Examiner

U.S. Cl. X.R.

156—172, 244; 300—21

UNITED STATES PATENT OFFICE
CERTIFICATE OF CORRECTION

PO-1050 (5/69)

Patent No. 3,743,557　　　　　Dated July 3, 1973

Inventor(s) Christian Stohr, Klaus Grohmann, and Siegbert O. Wagner.

It is certified that error appears in the above-identified patent and that said Letters Patent are hereby corrected as shown below:

Col. 3, line 41, after "2" --on-- should be inserted

Col. 3, line 46, "pin" should be --pins--

Col. 3, line 48, "faormed" should be --formed--

Col. 3, line 56, "added" should be --aided--

Col. 4, line 5, "britle" should be --bristle--

Col. 4, line 29, "sleeves" should be --sleeve--

Col. 4, line 30, "have" should be --has--

Col. 4, line 61, "care" should be --core--

Col. 4, line 62, "fitment" should be --filament--

Col. 4, line 71, "depolyed" should be --deployed--

Col. 5, line 8, "lenghs" should be --lengths--

Col. 6, line 3, "bristle" should be --bristles--

Col. 7, line 5, "straight" should be deleted

Claim 2, Col. 8, line 64, "from" should be --for--

UNITED STATES PATENT OFFICE
CERTIFICATE OF CORRECTION

Patent No. 3,743,557  Dated July 3, 1973

Inventor(s) Christian Stohr, Klaus Grohmann, and Siegbert O. Wagner.

It is certified that error appears in the above-identified patent and that said Letters Patent are hereby corrected as shown below:

Claim 2, Col. 9, line 3, "rod to retain therein the impressed portion of the loops." is a repetition of lines 1 and 2 of Col. 9 and should be deleted.

Signed and sealed this 2nd day of April 1974.

(SEAL)
Attest:

EDWARD M. FLETCHER, JR.
Attesting Officer

C. MARSHALL DANN
Commissioner of Patents